United States Patent
Mohamed

(10) Patent No.: US 11,176,539 B2
(45) Date of Patent: Nov. 16, 2021

(54) CARD STORAGE HANDLER FOR TRACKING OF CARD DATA STORAGE ACROSS SERVICE PROVIDER PLATFORMS

(71) Applicant: PAYPAL, INC., San Jose, CA (US)

(72) Inventor: Riaz Ebrahim Mohamed, Singapore (SG)

(73) Assignee: PAYPAL, INC., San Jose, CA (US)

( * ) Notice: Subject to any disclaimer, the term of this patent is extended or adjusted under 35 U.S.C. 154(b) by 308 days.

(21) Appl. No.: 16/184,857

(22) Filed: Nov. 8, 2018

(65) Prior Publication Data
US 2020/0151707 A1    May 14, 2020

(51) Int. Cl.
*G06Q 20/00* (2012.01)
*G06Q 20/34* (2012.01)
*G06Q 20/38* (2012.01)
*G06Q 20/40* (2012.01)

(52) U.S. Cl.
CPC ....... *G06Q 20/351* (2013.01); *G06Q 20/3829* (2013.01); *G06Q 20/409* (2013.01); *G06Q 20/4016* (2013.01); *G06Q 2220/00* (2013.01)

(58) Field of Classification Search
CPC ............. G06Q 20/351; G06Q 20/3829; G06Q 20/409; G06Q 20/4016; G06Q 2220/00; G06Q 20/36; G06Q 20/12; G06Q 20/4014
See application file for complete search history.

(56) References Cited

U.S. PATENT DOCUMENTS

| | | | | |
|---|---|---|---|---|
| 5,590,197 | A | * | 12/1996 | Chen ...................... G06Q 20/04 380/30 |
| 2002/0126850 | A1 | | 9/2002 | Allen et al. |
| 2013/0246203 | A1 | | 9/2013 | Laracey |
| 2015/0379283 | A1 | | 12/2015 | Spodak et al. |

FOREIGN PATENT DOCUMENTS

WO    WO 2017/175926    10/2017

OTHER PUBLICATIONS

Free et al. "Do You Know Where You Store Card Data? Unencrypted Credit Card Data Storage," Jul. 29, 2015, [retrieved Jan. 2, 2020], Retrieved from the Internet <URL:https://www.securitymetrics.com/blog/do-you-know-where-you-store-card-data>.
Hope-Bailie et al. "Payment Handler API,"In:W3C, Aug. 15, 2017, Retrieved from the Internet <URL:https://www.w3.org/TR/2017/WD-payment-handler-20170815/>.

* cited by examiner

*Primary Examiner* — Dante Ravetti
(74) *Attorney, Agent, or Firm* — Haynes and Boone, LLP

(57) ABSTRACT

There are provided systems and methods for a card storage handler for tracking of card data storage across service provider platforms. A transaction processor may provide a card storage handler that allows for tracking of data storage across different online platforms utilizing a public key of an asymmetric key pair. A user may utilize a device to generate and store the asymmetric key pair. The device may provide the transaction processor with the public key, and a card storage handler may be generated that tracks card data storage on the different online platforms. When the user enters their card data and public key to a service provider, the service provider may issue an API call using that data to the transaction processor. The transaction processor may generate a record of the storage and may allow for encrypted record retrieval by the device using the key pair.

19 Claims, 7 Drawing Sheets

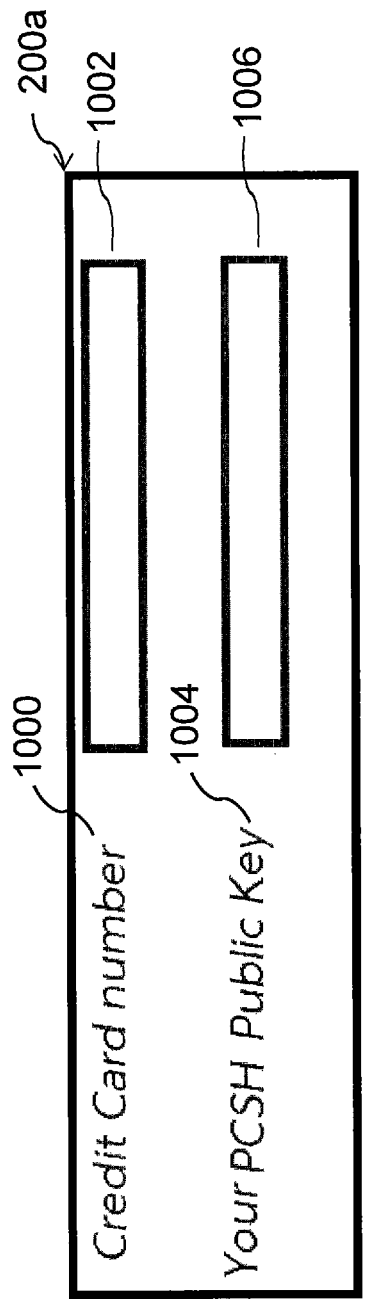

CARD STORAGE HANDLER FOR TRACKING OF CARD DATA STORAGE ACROSS SERVICE PROVIDER PLATFORMS

TECHNICAL FIELD

The present application generally relates to cross-platform storage data tracking and retrieval and more specifically to providing a data storage handler that allows for generating and storing records of service providers that store payment card data.

BACKGROUND

Various types of service providers may provide services to users, merchants, other entities, including goods and services for rent, credit cards, transportation, online shopping and other types of billable service. These service providers may require payment for these services, which may occur at specific intervals (e.g., monthly) and/or based on use of the service. These service providers may provide online platforms and accounts to users for use in processing transactions electronically for these services, which may be used to store information for financial instruments used by the service providers to process the transactions. However, this requires the user to establish multiple different online accounts for transaction processing and store sensitive information (e.g., personal and/or financial information) with the accounts and platforms. This increases exposure of this sensitive information to online threats that compromise the online platforms and lead to theft and abuse of this information, which may be caused by database breaches, hackers, and other types of online bad actors and devices. Therefore, with the increasing number of security threats to online platforms, the user runs an increased risk of compromising their personal and financial information when individual online resources store this sensitive information.

This risk is further increased by the ever-expanding number of online platforms (or online merchants) and number of different funding sources a user may use. This provides more exposure, while making it harder and harder for the user to track what funding source is stored/used with what online platform.

BRIEF DESCRIPTION OF THE DRAWINGS

FIG. 2A is an exemplary graphical user interface (GUI) for registration and storage of a payment card number by a service provider with a public key used for recording the storage with a payment card storage handler service, according to an embodiment;

FIG. 2B is an exemplary GUI representation of a table displaying records of payment card storages and removals held by a payment card storage handler, according to an embodiment;

Figure 1:
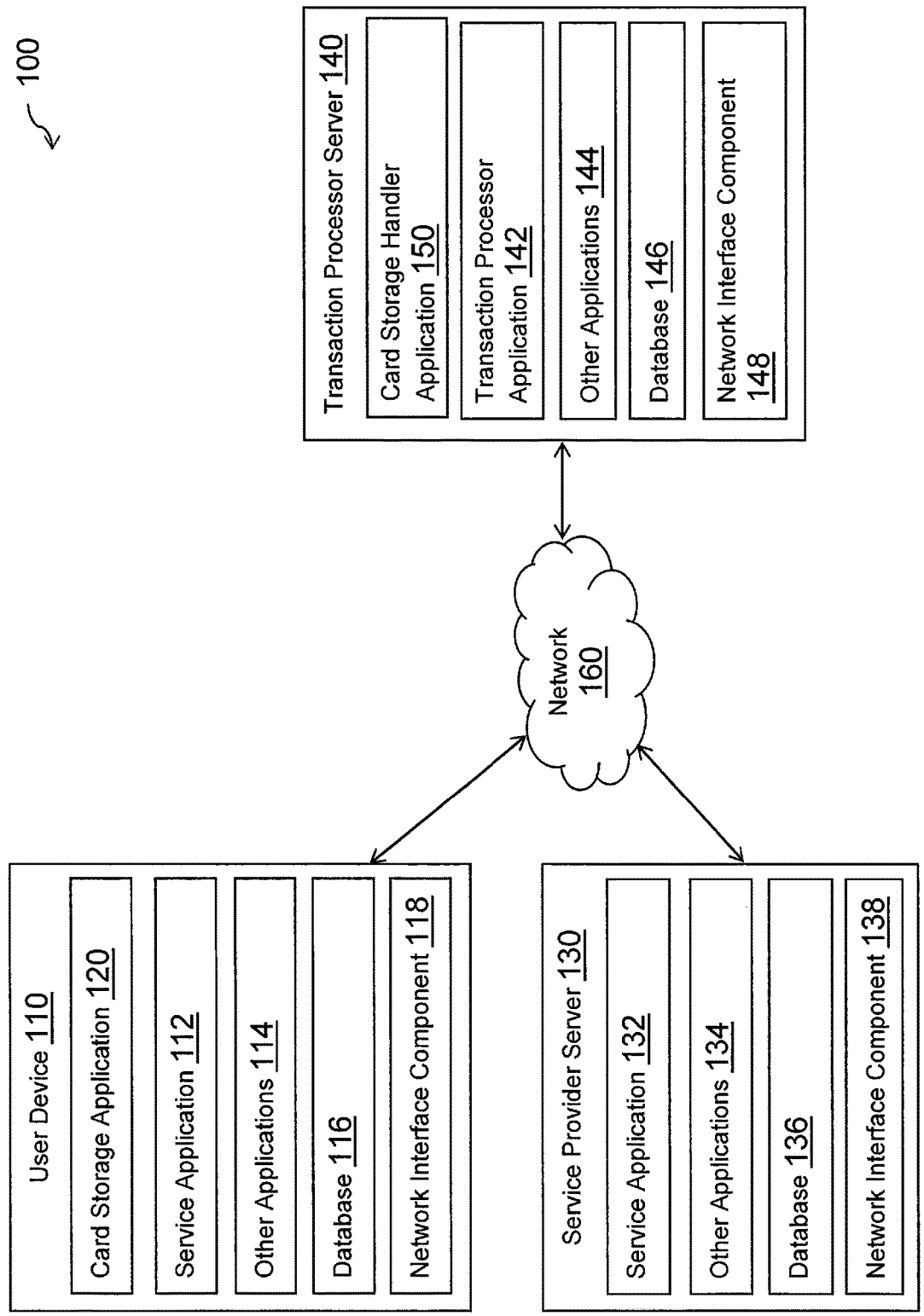
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a card storage handler for tracking of card data storage across service provider platforms. Systems suitable for practicing methods of the present disclosure are also provided.

An online payment card storage handler, such as a transaction processor may provide services for tracking of card data entry, storage, and/or removal from online platforms, such as payment card numbers, card user name, card code verification numbers, personal identification numbers, expiration dates, billing/shipping information, and/or other card data that may be entered to an online digital platform of a service provider. The online platform may correspond to a merchant or other type of service provider that provides goods or services that may be purchased through electronic transaction processing through the card data. Thus, the service providers and/or merchants may also provide goods or services to the user, which may incur a cost owed by the user for receipt of the goods or services. A service provider may generate a bill for the user based on the goods/services, which may be generated at certain time intervals (e.g., monthly) or may be a one-time bill. For example, an online service provider that provides transportation services may process and bill card data after transportation services are provided, and may store the card data for ease of use by a user (e.g., through a device application or website). Similarly, a car company may provide an online platform to pay monthly lease/loan payments (or other vehicle fees), where the payments may be automatically or on command paid using card data that is stored to the platform. The service provider may provide the online platform that allows the user to provide a payment for the bill electronically by establishing an account with the service provider and entering data for a payment instrument, which may include a credit card, payment card, bank account, or other financial information.

In this regard, the transaction processor may provide the payment card storage handler (also referred to as a "card storage handler" or PCSH) in order to track entry of card data on the online service providers' platforms, as well as determine whether the card data has been removed or changed and if the service provider is trusted or use of the service provider or card data is potentially fraudulent. The transaction processor may first generate the card storage handler for a user on request from a device of the user. The transaction processor may negotiate encryption keys with the device, where the device may generate (with the transaction processor in certain embodiments), an encryption key pair, such as an asymmetric key pair having a public key and a private key. The private key may be stored by the device, and the public key may be shared between the transaction processor and the device. Using the public key, the transaction processor may generate a card storage handler for the user. The user may share additional data with the transaction processor for the card storage handler, such as card data for one or more payment cards, or other financial data. Additionally, the user may provide user information, including personal, billing, shipping, or other user information that may be utilized with the financial data.

When generating the payment card storage handler, the process may be initiated by a user downloading and installing an application on a trusted device. In other embodiments, the user may be required to establish an account with the transaction provider in order to engage in use of the card storage handler, as well as electronic transaction processing with online service provider platforms. During creation of the card storage handler account, the user may be required to provide identification information to establish the account, such as personal information for a user, business or merchant information for such an entity, or other types of identification information including a name, address, and/or other information. The user may also be required to provide financial information, including payment card (e.g., credit/debit card) information, bank account information, gift card information, and/or benefits/incentives, which may be used to provide funds to the account and/or an instrument for transaction processing. The user may also be required to select an account name and/or provide authentication credentials, such as a password, personal identification number (PIN), answers to security questions, and/or other authentication information. However, not all information may be necessary in all embodiments.

After establishing the payment card storage handler on the transaction processor's online platform, the user may then utilize the public key when entering, registering, and/or storing card data with other service provider's platforms. For example, the user may access an online platform for a merchant or service provider (e.g., in a merchant/service provider application or website) to view a bill for goods or services provided by the entity through one or more interfaces provided by the platform, and/or provide payment card data for processing for future payments. For example, a graphical user interface of a device used to access the entity's online platform and view the bill available for processing electronically or add card data that may be used to pay for goods to services. In various embodiments, the user may be required to setup an account with the entity's online platform bill. For example, a merchant may require a user to generate an account to view the user's bills or payment for goods. The billing platform for the service provider may be accessed through an authentication process and an account access portal in a website or a dedicated application of the service provider's platform, and the interfaces of the platform may allow a user to interact with the service provider to provide payments.

During this process, the service provider may display one or more graphical user interfaces (GUIs) that allow for entry of card data, one or more GUIs, or a portion of a GUI, may request that the user enter the card data, such as in an interface field. This may be accompanied by a request to enter the public key. The key may be entered by the user typing in the key, or may be loaded by the user's trusted device that stores the public/private key pair to the field of the interface. Once the public key is entered with the card data, an application programming interface (API) call through an API of the service provider may be structured to include data for at least a portion of the card data that allows for identification of the payment data and the payment key. This API call may be received by the transaction processor, and the transaction processor may then determine the corresponding card storage handler for the user using the public key. In various embodiments, the API may also include an identifier for the service provider, the status of storage of the card data in a database of the service provider (e.g., added, updated, removed, etc.), and/or a time of the status (e.g., when added or removed). However, in other embodiments, this data may also be determined by the transaction processor using the data from the API calls originating endpoint (e.g., IP/MAC address), time of the API call, and/or whether the service provider is new or has a previous status in the card storage handler (e.g., by treating all new storage notifications as a "storage status," and providing subsequent API calls from the same service provider for the same key/card data as changing the previous status from "stored" to "removed" to "stored" and so on). This data may then be stored with the card storage handler as a record for the service provider.

The card data may then be processed by the service provider (as well as the transaction processor where the transaction processor provides electronic payment services). The user may set up recurring or automatic payments for the entity using the stored card data through one or more interfaces, or may select a payment amount and issue a one-time payment. When processing the payment, the service provider may utilize the card data, and may store the card data, which causes the API call to the transaction processor as described above. Thus, the transaction processor generates a record of storage of the card data by the service provider. However, during one-time payments where the card data may be processed and not stored, the transaction processor may not receive the API call, or may determine that the card data is not stored by the service provider and may not generate a record.

If the user discontinues use of the service provider, for example, by no longer purchasing or requesting goods or services from the merchant or other service provider, the user may request that the service provider remove the user's card data from their database and platform. The user may reenter the user's public key when requesting removal and deletion of their card data, as well as the card data when necessary. However, in other embodiments, the service provider may retain the information from the previous storage. The service provider may then perform another API call, utilizing the same or a different API, to update the transaction processor of the removal of the card data, and proceed to delete the stored card data. Where the same API is utilized, the API parameters may be adjusted to account for the removal status, such as a new identifier for "removal" of the card data by the service provider. However, in other embodiments, the API call may include the same data as before, and the transaction processor may infer the deletion from the previous stored status. The transaction processor may then update its record to show that the service provider has removed the card data from its platform.

The user may then query the transaction processor for records associated with the user's payment card storage handler and/or the card storage records particular associated with a public key. The user may transmit the public key to the transaction processor, and the transaction processor may look up all records associated with the public key and/or the user's card storage handler (e.g., where the user uses more than one public key with their card storage handler). The transaction processor may then utilize the public key to encrypt the records, which may only be capable of being decrypted by the private key associated with the public key and stored to the user's device. The resulting encrypted data may be transmitted to the user's device, and the user's device may decrypt the encrypted data using the private key. The records may then be displayed to the user so that the user may view the service provider's that store their card data, a status of the card data with those service providers, and a time that the status was generated.

In certain embodiments, the transaction processor that provides the card storage handler may also provide additional services, including electronic transaction processing for online transactions with these service providers using the payment card storage handler as a type of digital wallet. For example, the user may only enter their public key to a merchant or other service provider's payment/billing interface (as described above, omitting entry of the card data). The transaction processor may receive the key, and may generate a digital token that is associated with the user's payment card and allows the transaction processor to identify the payment card when received for transaction processing. However, the tokenization process may obscure or otherwise prevent the service provider from viewing the card data. The user may also authorize that the service provider directly pull their card data from the card storage handler service of the transaction processor using the user's public key. Finally, if the card data becomes associated with another public key or is otherwise used with a service provider (e.g., without entry of the public key), the transaction processor may alert the user of the potential fraudulent transaction. The user's account may then be used by the user to perform electronic transaction processing. In various embodiments, a website may provide the transaction processing services, and thus may be accessed by a web browser application. The application (or website) may be associated with a payment provider, such as PayPal® or other online payment provider service, which may provide payments and the other aforementioned transaction processing services on behalf of users, merchants, and other entities. However, a dedicated application of the transaction processor may also be utilized.

The transaction processor may also act in an authority role, similar to Certificate Authority, for use in validating merchants and other service providers. For example, the transaction processor using the above payment card storage handler may validate service providers utilizing available risk data, such as whether the service provider has valid Secure Socket Layer (SSL) certificates or other digital certificates issued by a Certificate Authority after validation of the service provider, the service provider's risk and fraud reputation, and/or past fraudulent behavior associated with the service provider. The transaction processor may then only allow valid providers to participate in using the card storage handler services (e.g., those service providers that have low risk, such as below a threshold score). The transaction processor may also renew validation based on risk scores. The transaction processor may provide the user with an identification of whether the service provider is validated when attempting to enter card data and/or their card storage handler's public key. This may appear in an interface, pop-up, message, or other notification of the service provider's validation. Moreover, a plug-in or feature in other applications, including browser applications may incorporate this indicator to show valid service providers and/or online websites.

In this manner, a transaction processor may utilize provide a payment card storage handler that provides a unified data view of card data entered to multiple service providers. This provides viewing of data from multiple different online platforms in a single application dashboard interface. Moreover, the public/private key use and encryption allows for secure data linking with the transaction processor, as well as data retrieval without risking record confidential breach. Moreover, if service providers become comprised, such as due to a hack, a user may utilize their public key to securely retrieve data on their card storages with service providers and determine whether data may be compromised, as well as delete card data from compromised or unused service provider. This provides additional security to the user by preventing proliferation of sensitive data across multiple platforms that may be susceptible to data breach by malicious users. The transaction processor may also identify secure and compromised online websites and other platforms and easily identify their status in an interface of the user. The transaction processor may therefore provide increased online data security and a single convenient platform that provides data access and retrieval in a faster, more convenient, and more secure manner than previously performed.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a service provider server 130, and a transaction processor server 140 in communication over a network 160. User device 110 may be utilized to access the various features available for user device 110, which may include processes and/or applications associated with transaction processor server 140 to register storage and/or removal of card data from storage by service provider server 130. User device 110 may also be used to establish a card storage handler with transaction processor server 140 through negotiation of an asymmetric key pair. User device 110 may then be used to provide the public key to service provider server 130 when adding or removing card data from storage by service provider server 130. Transaction processor server 140 may receive data of the additions or removals of the data, and may generate records of such statuses with the corresponding card data (and other data where requested) in the card storage handler. User device 110 may then use the public key secure receive encrypted record data from transaction processor server 140 to view the card storage status for particular payment cards.

User device 110, service provider server 130, and transaction processor server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented as a communication device that may utilize appropriate hardware and software configured for wired and/or wireless communication with service provider server 130, and/or transaction processor server 140. For example, in one embodiment, user device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. User device 110 may correspond to a device of a consumer or a fraudulent party utilizing an account during electronic transaction processing with a disparate entity, such as the merchant associated with service provider server 130. Although only one communication device is shown, a plurality of communication devices may function similarly.

User device 110 of FIG. 1 contains a card storage application 120, a service application 112, other applications 114, a database 116, and a network interface component 118. Service application 112 and other applications 114 may correspond to executable processes, procedures, and/or applications with associated hardware. In other embodiments, user device 110 may include additional or different modules having specialized hardware and/or software as required.

Card storage application 120 may correspond to one or more processes to execute software modules and associated devices of user device 110 to generate a payment card storage handler having a key pair used for tracking card storages across multiple online platforms including service provider server 130, and allow for retrieval of card storage records from transaction processor server 140. In this regard, card storage application 120 may correspond to specialized hardware and/or software utilized by a user of user device 110 that may be used to access a website or an application interface of transaction processor server 140 that allows user device 110 to establish an account for a the card storage handler. In order to establish the card storage handler, user device 110 may generate or negotiate an encryption key pair, such as an asymmetric public/private key pair. Card storage application 120 may provide the public key to transaction processor server 140 for use in generating the card storage handler associated with user device 110 and the user for user device 110, as discussed here. Card storage application 120 may also locally store the public and private key.

As discussed herein, card storage application 120 may utilize user financial information, such as a credit card, bank account, or other financial account, as a payment instrument when providing payment information for the card storage handler, and may associate one or more payment cards or other financial information with the public key. Additionally, service application 112 may establish authentication credentials and/or by a data token that allows secure access to the card storage handler and/or use of the card storage handler. In various embodiments, card storage application 120 may correspond to a general browser application configured to retrieve, present, and communicate information over the Internet (e.g., utilize resources on the World Wide Web) or a private network. However, in other embodiments, card storage application 120 may include a dedicated application of transaction processor server 140 or other entity (e.g., a merchant), which may be configured to assist in processing transactions electronically.

Card storage application 120 may then be utilized when entering in payment card details or data with a service provider, such as service provider server 130, to generate a record for card storage and use by the service provider. For example, card storage application 120 may be used to retrieve and enter the public key to a field of a website or application form that allows entry of the public key when entering in payment card data. However, in other embodiments, the user associated with user device 110 may remember the public key, and may directly enter the public key without utilizing card storage application 120. A record may be generated using the public key by transaction processor server 140 after receiving details of the storage of the card data by service provider server 130, which includes the entered public key.

After generation of records, card storage application 120 may be utilized to retrieve the records of card storages by the user's card storage handler with transaction processor server 140. For example, card storage application 120 may transmit the public key to transaction processor server 140 with a request for the records in the user's card storage handler. Transaction processor server 140 may determine the card storage handler using the public key, and may retrieve the records for the user's card storage handler. The records may then be encrypted using the public key, and the encrypted records may be transmitted to card storage application 120. Card storage application 120 may decrypt the received encrypted records, and may display the corresponding record data through one or more output interfaces.

Service application 112 may correspond to one or more processes to execute software modules and associated devices of user device 110 to process electronic transactions over a network with one or more other services and/or users using payment card data or other financial information for the user associated with user device 110. In this regard, service application 112 may correspond to specialized hardware and/or software utilized by a user of user device 110 to access a platform provided by service provider server 130, and perform electronic transaction processing, such as a website or online portal accessible through an application. During electronic transaction processing, service application 112 may be utilized to enter card data or other financial information in one or more interface fields. Additionally, service application 112 may provide the public key utilized for the user's payment card storage handler within a field, which may be utilized by transaction processor server 140 for generation of card storage records. Service application 112 may then request that the card data is stored by service provider server 130 after entry of the card data and the payment key. Service application 112 may also be utilized to access service provider server 130 and request that the card data be removed from one or more databases of the service provider, which may cause service provider server 130 to remove the card data and update transaction processor server 140, as discussed herein. When requesting removal, the public key may be re-entered, or may be determined from stored data with the card data by service provider server 130.

In various embodiments, service application 112 may correspond to a general browser application configured to retrieve, present, and communicate information over the Internet (e.g., utilize resources on the World Wide Web) or a private network. However, in other embodiments, service application 112 may include a dedicated application of service provider server 130 or other entity (e.g., a merchant), which may be configured to assist in processing transactions electronically. Service application 112 may also receive indicators of merchant or service provider risk and/or fraud, such as a validation certification generated by transaction processor server 140 for service provider server 130, and may display such icons, certificates, or other notifications when service application 112 access the service provider.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of user device 110, such as display devices capable of displaying information to users and other output devices, including speakers.

User device 110 may further include database 116 stored in a transitory and/or non-transitory memory of user device 110, which may store various applications and data and be utilized during execution of various modules of user device 110. Database 116 may include, for example, identifiers such as operating system registry entries, cookies associated with service application 112 and/or other applications 114, identifiers associated with hardware of user device 110, or other appropriate identifiers, such as identifiers used for payment/user/device authentication or identification, which may be communicated as identifying user device 110 to transaction processor server 140. Database 116 may include information for a card storage handler, such as a public/private key pair, which may be utilized to generate, retrieve, and decrypt card storage records by service providers.

User device 110 includes at least one network interface component 118 adapted to communicate with service provider server 130 and/or transaction processor server 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Network interface component 118 may communicate directly with nearby devices using short range communications, such as Bluetooth Low Energy, LTE Direct, WiFi, radio frequency, infrared, Bluetooth, and near field communications.

Service provider server 130 may be maintained, for example, by an online service provider, which may provide online transaction processing services for payment of goods and/or services (e.g., items). In this regard, service provider server 130 includes one or more processing applications which may be configured to interact with user device 110, transaction processor server 140, and/or another device/server to facilitate transaction processing for purchase of items, and may provide the corresponding items to users. Thus, service provider server 130 may provide an online platform for use in purchasing items, such as a website or other online resource accessible by user device 110. Service provider server 130 may be maintained by or include any type of service provider, which may sell items to users.

Service provider server 130 of FIG. 1 contains a service provider application 132, other applications 134, a database 136, and a network interface component 138. Service provider application 132 and other applications 134 may correspond to executable processes, procedures, and/or applications with associated hardware. In other embodiments, service provider server 130 may include additional or different modules having specialized hardware and/or software as required.

Service provider application 132 may correspond to one or more processes to execute modules and associated specialized hardware of service provider server 130 that provide an online platform for the purchase of goods and/or services from the service provider or merchant corresponding to service provider server 130. In this regard, service provider application 132 may correspond to specialized hardware and/or software of service provider server 130 to provide a convenient interface to permit the service provider to enter, view, and/or edit goods and/or services for use and/or purchase by the user associated with user device 110, which may cause generation of a bill for the services and may be a recurring or automatic payment using stored payment card or other financial information. For example, service provider application 132 may be implemented as an application having a user interface enabling a merchant to enter item information and request payment for a transaction on checkout/payment of one or more items/services. In other embodiments, service provider application 132 may generate a bill for other services provided by the service provider, such as rent, utilities, car loans, house mortgages, student loans, and/or other types of services having one-time or recurring payments that may be processed using a bill. In certain embodiments, service provider application 132 may correspond more generally to a web browser configured to view information available over the Internet or access a website corresponding to service provider server 130. Service provider application 132 may provide goods and services sales and billing through an online platform. Thus, a user using user device 110 with service provider server 130 may process a transaction using service provider application 132.

Once a payment amount is determined for a transaction for items to be purchased by a customer, the merchant may request payment from the customer, for example, through a bill generated for the transaction. The provided transaction information may be made available for access by user device 110. The data may be accessed using an account, where service provider application 132 may provide a transaction processing interface on the online platform accessible by user device 110 through the account. The user associated with user device 110 may access the account, and may enter card data for a payment card with a public key for the user's payment card storage handler. The public key may be used by service provider application 132 to provide an API call through an API to transaction processor server 140. The API may have parameters and/or data to designate that the card data is stored by service provider server 130. For example, the data for the API call may include at least the public key and the card data or a portion of the card data used to identify the payment card. In some embodiments, the API call may also include an identifier for service provider server 130, a status (e.g., stored/removed) of storage of the card data, and/or a time/date that the status occurred.

Transaction processor server 140 may process the transaction using the card data in certain embodiments. Service provider application 132 may then receive a payment and funds to pay for the billed amount, and may complete transaction processing for the bill based on the received payment. In certain embodiments, just the public key may be entered by the user, and service provider application 132 may utilize the public key to pull the card data from transaction processor server 140. Additionally, the user may utilize transaction processor server 140 to transmit a token to service provider application 132, which may instead act as the payment instrument when requesting payment by transaction processor server 140. Service provider application 132 may also provide risk data, such as a reputation for service provider server 130 and/or transaction fraud information, which may be utilized to generate a risk assessment and validate service provider server 130.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 160, or other types of applications. Other applications 134 may include server interface applications for an online server platform that output data to one or more devices. For example, other applications 134 may contain software programs, executable by a processor, including a graphical user interface (GUI) configured to provide interface data for display on devices.

Service provider server 130 may further include database 136 stored in a transitory and/or non-transitory memory of service provider server 130, which may store various applications and data and be utilized during execution of various modules of service provider server 130. Database 136 may include, for example, identifiers such as operating system registry entries, cookies associated with service provider application 132 and/or other applications 134, identifiers associated with hardware of service provider server 130, or other appropriate identifiers, such as identifiers used for payment/user/device authentication or identification. In various embodiments, database 136 may include transaction and/or bill information for one or more payments required using card data. Additionally, database 136 may store the card data for a payment, as well as a public key used to identify the storage of the card data to transaction processor server 140.

Service provider server 130 includes at least one network interface component 138 adapted to communicate with user device 110 and/or transaction processor server 140 over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Transaction processor server 140 may be maintained, for example, by an online service provider, which may provide transaction processing services on behalf of users and/or merchants including generation, use, and/or fraud/risk analysis services for digital gift card processing. In this regard, transaction processor server 140 includes one or more processing applications which may be configured to interact with user device 110, service provider server 130, and/or another device/server to facilitate transaction processing. In one example, transaction processor server 140 may be provided by PAYPAL®, Inc. of San Jose, Calif., USA. However, in other embodiments, transaction processor server 140 may be maintained by or include another type of service provider, which may provide connection services to a plurality of users.

Transaction processor server 140 of FIG. 1 includes a card storage handler application 150, a transaction processing application 142, other applications 144, a database 144, and a network interface component 148. Transaction processing application 142 and other applications 144 may correspond to executable processes, procedures, and/or applications with associated hardware. In other embodiments, transaction processor server 140 may include additional or different modules having specialized hardware and/or software as required.

Card storage handler application 150 may correspond to one or more processes to execute software modules and associated specialized hardware of transaction processor server 140 to provide payment card storage handlers to users that uses a public key to generate records of payment card data storages by service providers. In this regard, transaction processing application 142 may correspond to specialized hardware and/or software to generate a card storage handler on request by a user, such as the user associated with user device 110. Card storage handler application 150 may receive the request, and may generate or exchange encryption keys with user device 110. The encryption keys may correspond to an asymmetric key pair, and card storage handler application 150 may receive the public key. The public key may be used to generate the card storage handler. Additional information may also be used to generate the card storage handler, such as payment card details or information, other financial information, personal information, authentication credentials, or other account information.

Once generated, card storage handler application 150 may then receive card storage records transmitted by service provider server 130. For example, an API of service provider server 130 may transmit data to transaction processor server 140 through an API call that includes at least the public key and a portion or all of the card data that allows for identification of the payment card. An exemplary API call may include the following data: Public key=<Customer PCSH pubic key>; Credit Card-Stored=Yes; Last 4 digit=3254; Client ID=<UBER client ID on PCSH>, CC-Added-Date=6 Mar. 2018.

Card storage handler application 150 may generate and/or store a record in the card storage handler for the public key that includes at least the public key, the card data, and an identifier for the service provider (e.g., service provider server 130). The record may also include a status identifier for the storage status (e.g., whether the card data was stored or removed from database 136 of service provider server 130). The record may also include a time of the status, and may include any other data provided by service provider server 130 or determined by card storage handler application 150. In certain embodiments, the record may be a follow-up record through the same or similar API and a similarly structure API call that updates the previous record. For example, the subsequent API call may include information of a removal of card storage data from service provider server 130 based on a request and data deletion of the card data from storage. In further embodiments, the record may include a change to any of the data associated with the card that maybe needed for processing a transaction using the card, examples of which include a change in expiration date, billing address, shipping address, or the card verification value (CVV).

Card storage handler application 150 may also be queried for the records by user device 110. User device 110 may transmit the public key to card storage handler application 150, which may use the public key to retrieve the records for the corresponding card storage handler. In some embodiments, a card storage handler may include multiple public keys, such as public keys used for different payment instruments. Card storage handler application 150 may retrieve all or a part (e.g., limited by time, public key, status identifier, etc.) of the records from storage (e.g., database 146), and may encrypt the records using the public key. Card storage handler application 150 may then transmit the encrypted records to user device 110, which may be decrypted using the corresponding private key.

Card storage handler application 150 may also provide additional services to users using the card storage handler, for example, Certificate Authority services to validate service providers, digital wallet services, and/or alert services. Card storage handler application 150 may validate service providers using risk data, such as a service provider reputation, SSL certificate issuance, past fraud, etc., and may determine a risk score or otherwise validate the service provider. If the service provider is validated, card storage handler application 150 may display an icon in an interface associated with the service provider to let users know of the validation.

Card storage handler application 150 may also use the payment card storage handler to act as a digital wallet and fraud alert service for the associated user. For example, user device 110 may only provide the public key to service providers, where the public key may be used by the service providers to pull card data from the card storage handler that is used to process a transaction. Card storage handler application 150 may transmit a message to user device 110 to receive user consent (e.g., through SMS or email) to provide the card data or a token associated with the card data to the service providers. Card storage handler application 150 may provide a digital token that identifies the payment card data to card storage handler application 150, but does not reveal the card data to the storage provider, and therefore act as a tokenization service for a digital wallet. Additionally, if card storage handler application 150 receives a record data of the card data used with another separate public key or no public key, card storage handler application 150 may generate an alert for the user/user device 110 that may alert the use of the potential fraud.

Transaction processing application 142 may correspond to one or more processes to execute software modules and associated specialized hardware of transaction processor server 140 to provide payment and transaction processing services to merchants and users, for example though an account and/or payment instruments of the user in a digital wallet for the account. In this regard, transaction processing application 142 may correspond to specialized hardware and/or software to provide transaction processing and payment services through accounts, including digital wallets storing payment instruments. The services may allow for a payment through a payment instrument, including a credit/ debit card, banking account, payment account with transaction processor server 140, and/or other funding instrument. The payment may be used to provide a payment for a transaction or bill generated by a user with service provider server 130. In order to establish an account to send and receive payments, transaction processing application 142 may receive information requesting establishment of the account. The information may include user personal, business, and/or financial information. Additionally the information may include a login, account name, password, PIN, or other account creation information. The user establishing the account may provide a name, address, social security number, or other personal or business information necessary to establish the account and/or effectuate payments through the account. Transaction processing application 142 may further allow the user to service and maintain the payment account, for example, by adding and removing funding instruments. Transaction processing application 142 may be used to provide a payment for a transaction based on received payment information, which may include the public key. Transaction processing application 142 may process the payment to service provider server 130 using a payment instrument. Transaction processing application 142 may debit an account of the user and provide the payment to an account of the merchant or service provider. Transaction processing application 142 may also be used to provide transaction histories for processed transactions and bills.

In various embodiments, transaction processor server 140 includes other applications 144 as may be desired in particular embodiments to provide features to transaction processor server 140. For example, other applications 144 may include security applications for implementing server-side security features, programmatic client applications for interfacing with appropriate application programming interfaces (APIs) over network 160, or other types of applications. Other applications 144 may contain software programs, executable by a processor, including a graphical user interface (GUI), configured to provide an interface to the user when accessing transaction processor server 140, where the user or other users may interact with the GUI to more easily view and communicate information. In various embodiments, other applications 144 may include connection and/ or communication applications, which may be utilized to communicate information to over network 160.

Additionally, transaction processor server 140 includes database 144. As previously discussed, the user and/or the merchant may establish one or more digital wallets and/or accounts with transaction processor server 140. Digital wallets and/or accounts in database 144 may include user information, such as name, address, birthdate, payment instruments/funding sources, additional user financial information, user preferences, and/or other desired user data. Users may link to their respective digital wallets and/or payment accounts through an account, user, merchant, and/ or device identifier. Thus, when an identifier is transmitted to transaction processor server 140, e.g., from user device 110, one or more digital wallets and/or payment accounts belonging to the users may be found. Database 144 may also include card storage handlers and associated data, such as public keys and records for card storages of payment card data by service providers.

In various embodiments, transaction processor server 140 includes at least one network interface component 148 adapted to communicate with user device 110 and/or service provider server 130 over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

FIG. 2A is an exemplary graphical user interface (GUI) for registration and storage of a payment card number by a service provider with a public key used for recording the storage with a payment card storage handler service, according to an embodiment. In interface 200a of FIG. 2A, an interface form may be displayed by a user device, such as user device 110 discussed in reference to system 100 of FIG. 1. Interface 200a may be provided by a device application after accessing or generating a transaction or bill, where card data is required to be entered, stored, and/or processed. Thus, interface 200a may be utilized to generate a record of card storage after providing a public key that may be utilized to update a card storage handler through an API call of the card storage.

Interface 200a includes a card number request 1000 and a PCSH public key request 1004. Card number request 1000 may request that a user enter their card number in a card number field 1002, where the entered data may be used to process a transaction and store the card data. Additionally, PCSH public key request 1004 may request that a user upload or enter their public key for their card storage handler in public key field 1006 of interface 200a. Utilizing the public key entered to public key field 1006, a record of the storage of the data entered to card number field 1002 may be transmitted to the card storage handler with the public key in public key field 1006 for storage.

FIG. 2B is an exemplary GUI representation of a table displaying records of payment card storages and removals held by a payment card storage handler, according to an embodiment. In interface 200b of FIG. 2B, an interface record table may be displayed by a user device, such as user device 110 discussed in reference to system 100 of FIG. 1. Interface 200b may be provided by a device application after querying a card storage handler for card storage records using a public key. Thus, interface 200b may display records of card storage after providing a public key to a transaction processor and decrypting received records using a corresponding private key.

For example, interface 200b includes multiple data fields for records of card storages by service providers. Public key field 1100 includes public keys 1110 utilized to generate the card storage records, such as a public key of an encryption key pair (shown as a series of letters but may be randomized during key generation). With each of public keys 1110, a credit card stored identifier 1102 may show a status of storage of card data with a service provider, such as status identifiers 1112 (e.g., stored/"Yes" or deleted/"Removed"). In other embodiments, status identifiers 1112 may include "Expiration Date Changed," CVV Changed," "Billing Address Changed," or "Shipping Address Changed." Last 4 digits 1104 may be utilized to identify a payment card number, such as digits 1114 that allow a user to determine which payment card is stored with a service provider. In other embodiments, other identifiers of the card may be used, including a name designated by the user, the card issuer/bank, and/or additional digits of the card number. Service 1106 may display the corresponding service, such as an identifier, name, navigation link, or other data that may identify one of service providers 1116. Service providers 1116 therefore allow a user to determine whether card data associated with digits 1114 is stored. Finally, interface 200b may display a credit card added or removed date 1108, such as dates 1118 that display when status identifiers 1112 were performed with service providers 1116 for digits 1104.

Figure 2C:
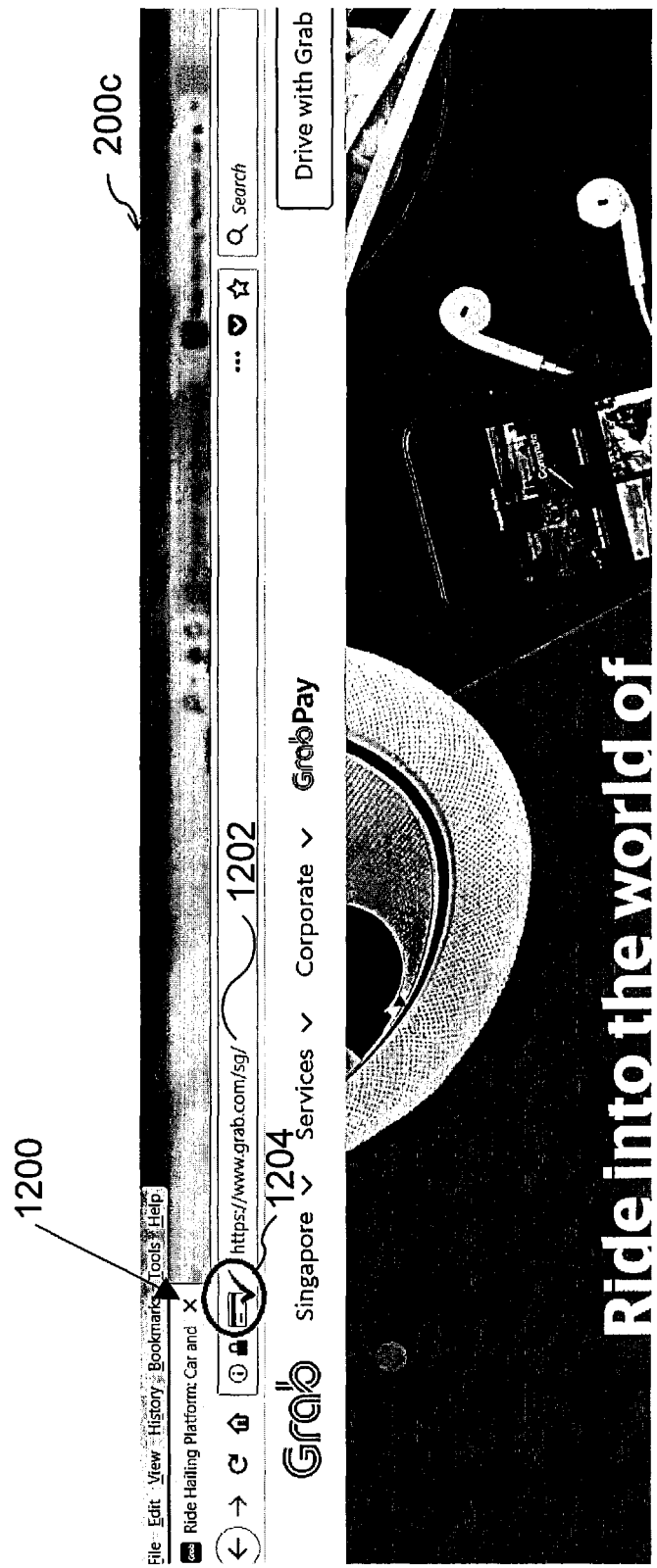
FIG. 2C is an exemplary GUI of a browser application displaying verified service providers based on risk analysis by a payment card storage handler, according to an embodiment.

FIG. 2C is an exemplary GUI of a browser application displaying verified service providers based on risk analysis by a payment card storage handler, according to an embodiment. In interface 200c of FIG. 2C, a navigation interface for a web browser may be displayed by a user device, such as user device 110 discussed in reference to system 100 of FIG. 1. Interface 200c may be provided by a device application when navigating to a service provider, where data may be displayed to allow users to know that the service provider has been validated and trusted. Thus, interface 200c may include an identifier or notification that indicates that the service provider is trusted to enter card data based on card storage handlers that certify the service provider.

For example, browser window 1200 may display a service provider website after accessing the service provider, where a user may purchase items through the website and allow for the service provider to store card data, In this regard, the service provider may require card data for recurring or automatic payments, and may store the card data to a database. Thus, after navigating to uniform resource locator (URL) address 1202, the user may wish to store card data with the service provider. A transaction processor service and/or card storage handler may provide an icon within browser window 1200 that displays that the service provider is trusted. The service provider and/or the browser application may be integrated with the card storage handler so as to provide the icon within the interface and/or browser window 1200. The check or icon may be added on top of a SSL certificate check so that the user may know that the service provider is safe for entry and storage of card data.

Figure 3:
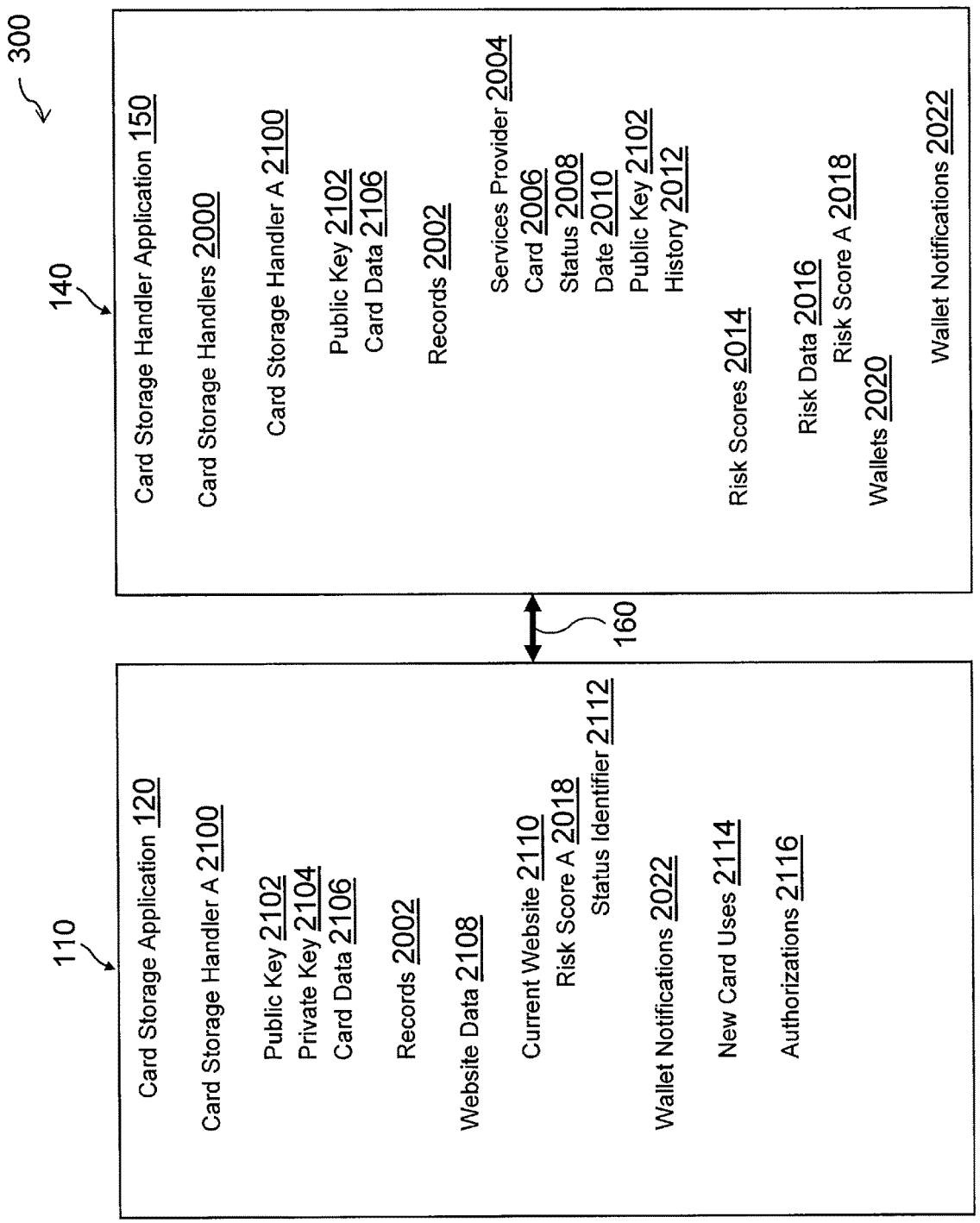
FIG. 3 is an exemplary system environment where a user device and a transaction processor server may interact to establish and use a payment card storage handler with service providers that store payment card data, according to an embodiment.

FIG. 3 is an exemplary system environment where a user device and a transaction processor server may interact to establish and use a payment card storage handler with service providers that store payment card data, according to an embodiment. FIG. 3 includes user device 110 and transaction processor server 140 discussed in reference to system 100 of FIG. 1.

In environment 300, transaction processor server 140 executes card storage handler application 150 corresponding generally to the processes and features discussed in reference to system 100 of FIG. 1. In this regard, card storage handler application 150 on transaction processor server 140 may provide card storage handlers 2000, which include card storage handler A 2100 accessed by user device 110. Thus, card storage handler A 2100 includes public key 2102 used to generate and access records 2002. Additionally, in certain embodiments, card data 2106 may also be stored with card storage handler A 2100. Records 2002 may be generated on each instance that transaction processor server 140 receives public key 2102 from a service provider when card data 2106 is entered to the service provider with public key 2102. Thus, records 2002 may include identifiers for the data received from or determined by an API call from the service provider to transaction processor server 140. For example, the identifiers may include identification data from one or more of service provider 2004 (e.g., a name or identifier), a card 2006 (e.g., a card number), a status 2008 (e.g., stored, removed, etc.), a date 2010 (of status 2008), public key 2102, and/or a history 2012 (e.g., of when the card is stored or removed from the service provider). Card storage handler application 150 may also be used to determine risk scores 2014 using risk data 2016. Risk score A 2018 may be determined and provided to user device 110 based on an accessed website. Card storage handler application 150 may also include wallets 2020 for wallet service provided by transaction processor server 140, which may include wallet notifications 2022 provided to user device 110.

In environment 300, user device 110 executes card storage application 120 corresponding generally to the processes and features discussed in reference to system 100 of FIG. 1. In this regard, card storage application 120 on user device 110 may generate and access a card storage handler A 2100 based on a public key 2102 associated with card storage handler A 2100. Public key 2102 may be generated with a private key 2104, where only the public key is provided to service providers and transaction processor server 140 for use in generating card storage records for card data 2106, such as records 2002. In order to receive records 2002, public key 2102 may be provided to transaction processor server 140, and records 2002 may be encrypted and transmitted back to user device 110. Private key 2104 may be used to decrypt records 2002 and display records 2002, which may show service providers storing card data 2106.

Additionally, card storage application 120 may receive website data 2108 of a current website 2110 that user device 110 may be displaying, such as a website of a service provider. A risk score A 2018 may be determined for current website 2110 that indicates the trustworthiness or risk in providing and/or storing card data by current website 2110. Status identifier 2112 may be used to display the validation, certification, or risk associated with risk score A 2018. Card storage application 120 may also be used to display wallet notifications 2022 associated with digital wallet services provided by the user's card storage handler. For example, new card uses 2114 may display when a payment card and/or public key is used, which may be used to prevent fraud. The card uses may also be used to provide authorizations 2116 for new card uses 2114, which may authorize the card uses so that processing may be performed.

Figure 4A:
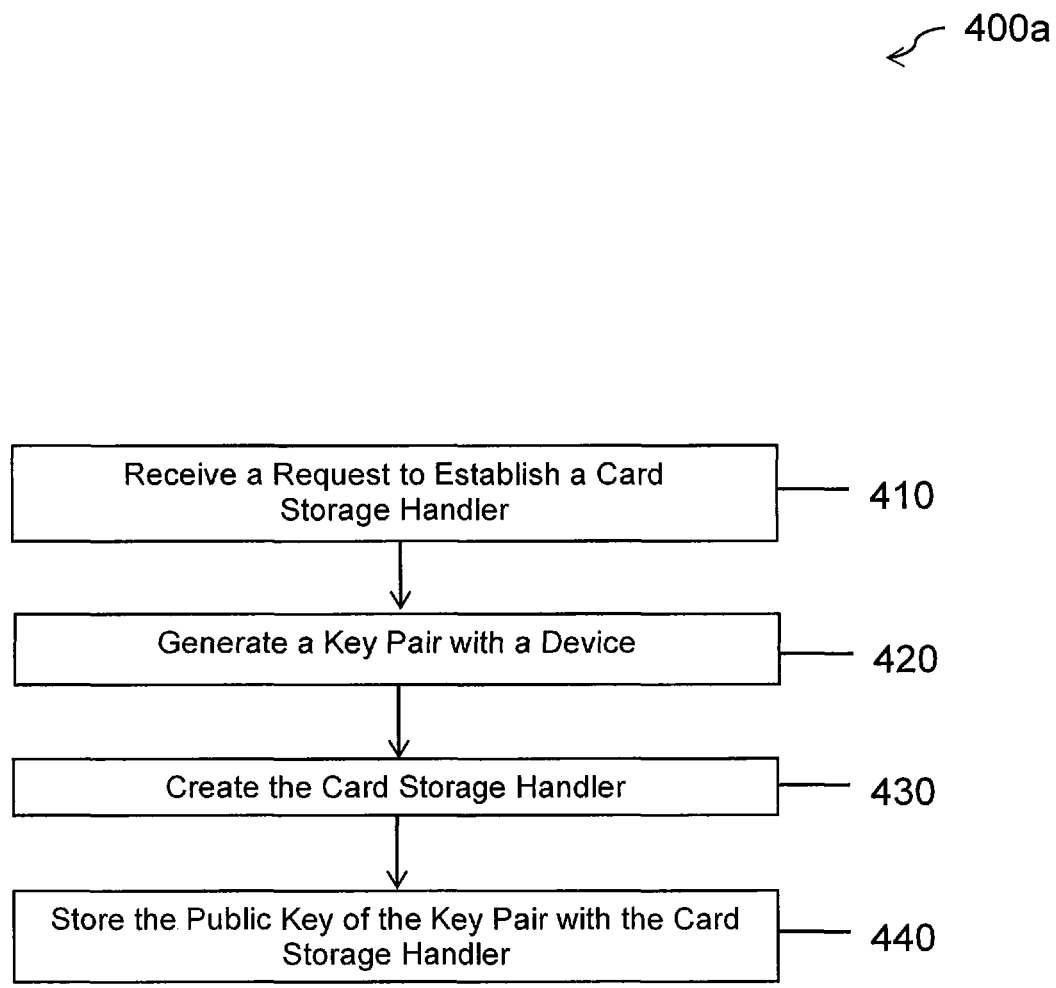
FIG. 4A is a flowchart of an exemplary process for establishing a card storage handler for tracking of card data storage across service provider platforms, according to an embodiment.

FIG. 4A is a flowchart 400a of an exemplary process for establishing a card storage handler for tracking of card data storage across service provider platforms, according to an embodiment. Note that one or more steps, processes, and methods described herein may be omitted, performed in a different sequence, or combined as desired or appropriate.

At step 410 of flowchart 400a, a request to establish a card storage handler is received, for example by a transaction processor or other online service that provide payment card storage handlers for tracking of card storages across different service provider platforms. The request may be provided by a device of a user, and the request may include additional data necessary to establish an account, including authentication information, payment/financial information, or other account information. The device may provide the request after downloading and executing a payment card storage handler application provided by the transaction processor. Once received, at step 420 of flowchart 400a, a key pair may be generated with a device. The key pair may correspond to an encryption key pair, such as an asymmetric key pair having a public and private key. The device may independently generate the key pair, for example, using the device's application(s), or may negotiate the key pair with the transaction processor. The public key may be shared with the transaction processor, as well as input to service providers when entering card data for storage, as discussed herein. However, the private key may be stored solely by the device and/or transferred to another device, which may be used for decryption of card storage record data for the card storage handler.

Thus, at step 430 of flowchart 400a, the card storage handler may be generated by the transaction processor. The card storage handler may include record tables used to record storages of card data by services providers, which may include the card data and/or payment card identifier, service provider's identity, a status of whether the card data is stored or removed, and a time of the status. Additional table columns for other parameters may also be utilized. At step 440 of flowchart 400, the public key of the key pair is stored with the card storage handler to allow for data record generation when receiving the public key with a card identifier, as well as record retrieval by the user's device when the public key is provided to the transaction processor.

Figure 4B:
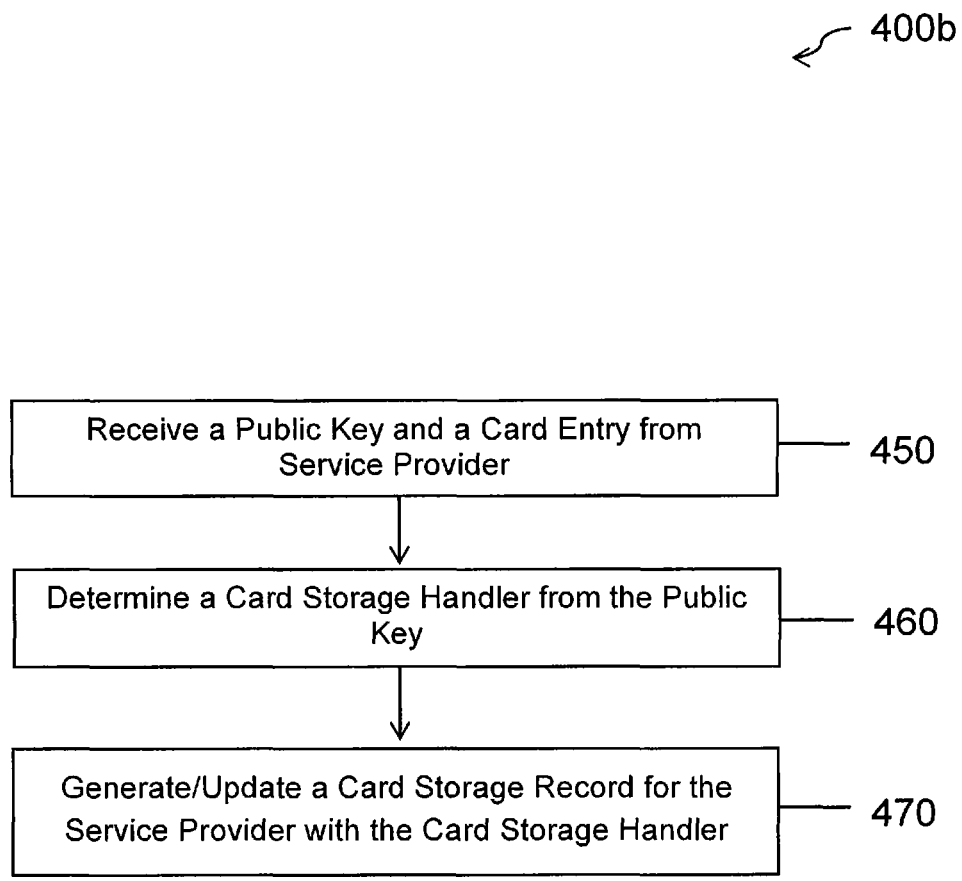
FIG. 4B is a flowchart of an exemplary process for utilizing a card storage handler for tracking of card data storage across service provider platforms, according to an embodiment.

FIG. 4B is a flowchart 400b of an exemplary process for utilizing a card storage handler for tracking of card data storage across service provider platforms, according to an embodiment. Note that one or more steps, processes, and methods described herein may be omitted, performed in a different sequence, or combined as desired or appropriate.

At step 450 of flowchart 400b, the public key and a card entry is received from a service provider. The card entry may include data parameters associated with storage of card data by the service provider, such as a payment card's identifier for the card data (e.g., all or a portion of the payment card number), a status identifier for the storage or removal and a time of the status, and/or other data. However, in other embodiments, the transaction processor may determine such data based on the incoming API call. Thus, the transaction processor may receive the API call through an API of the service provider, which may include the aforementioned data parameters and may be generated when the user provides the public key to an interface field when requesting card data is stored by the service provider. Thus, the service provider's API may recognize the public key and the corresponding transaction processor when the public key is entered to an interface field, and may transmit the API call to the transaction processor to generate or update a record for the corresponding card storage handler.

At step 460 of flowchart 400b, a card storage handler is determined from the public key by identifying a correspond set of record data using the public key. As each record is created based on incoming API calls having the public key entered with the card data, the corresponding record may be associated with the public key, which allows for aggregation of data in the card storage handler. Thus, at step 470 of flowchart 400b, a card storage record associated with the service provider that transmitted the API call having the public key is generated or updated in the card storage handler's record. For example, the record may be generated when the API call indicates new card data storage by a service provider. However, where a record already exists for the service provider and the corresponding card data, the existing record may be updated based on a change of the storage status parameter (e.g., changed to "removed" to indicate deleted card data from a service provider's storage).

Subsequent to the generation of records, additional steps may be provided. For example, the user's device having the public and private keys may query the transaction process for the card storage record for the card storage handler. The user's device may transmit the public key to the transaction processor, which may perform lookup of the corresponding card storage handler using the public key. The transaction processor may verify the public key and the device, and may retrieve the records. The transaction processor may then encrypt the records using the public key, and transmit the encrypted records back to the user's device. Once received, the user's device may decrypt the data using the private key. In this manner data may be securely exchanged and the use of the public key may allow for tracking of stored data by service providers across multiple different online platforms.

Figure 5:
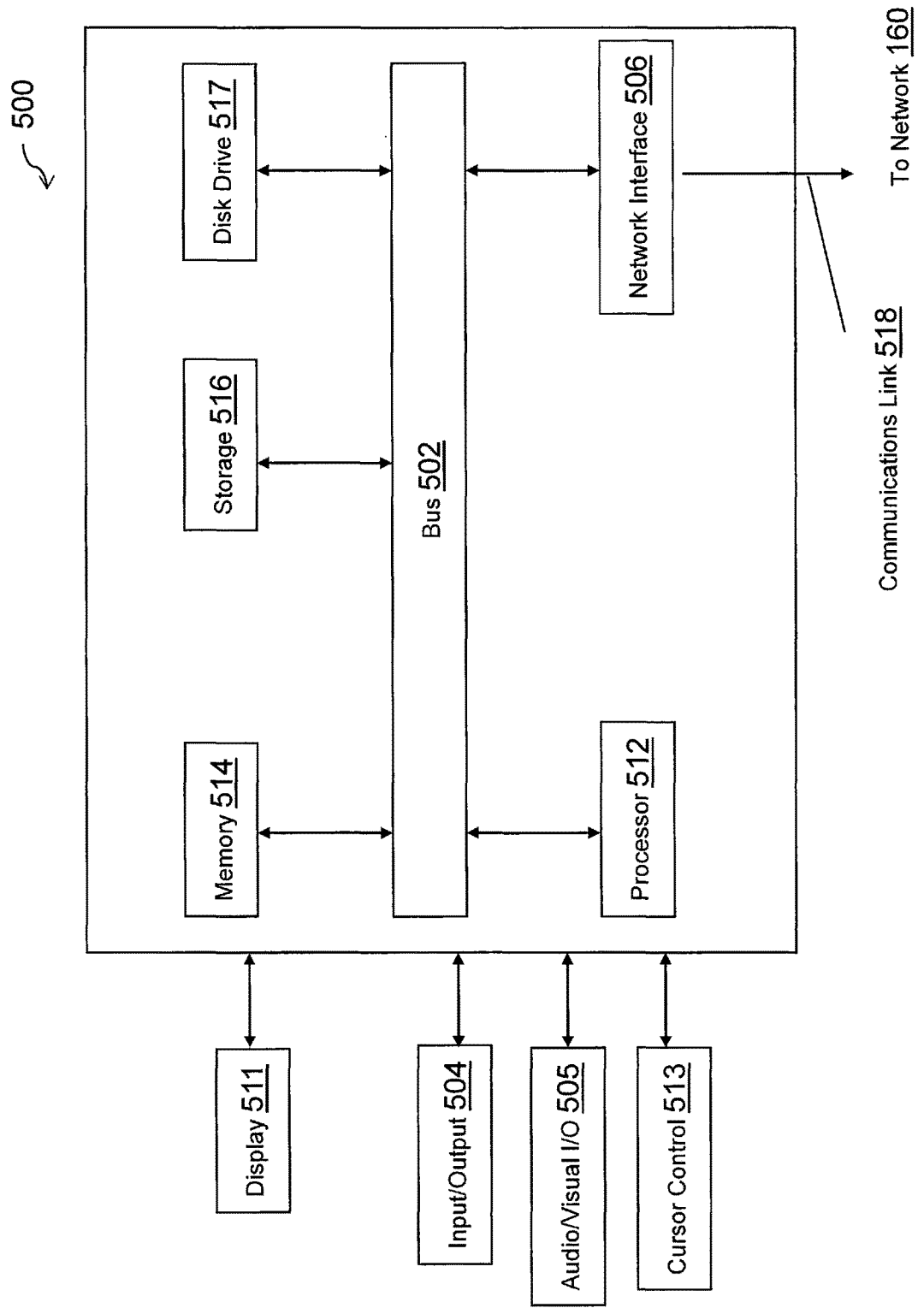
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory storing a card storage handler for a user and comprising a first card number and a public key associated with the card storage handler, wherein the non-transitory memory further stores a plurality of card storage handlers associated with a plurality of users; and
   one or more hardware processors configured to execute instructions to cause the system to perform operations comprising:
      receiving, from a service provider, a request to add a card to the card storage handler, wherein the request includes the public key, a first status identifier, and at least a portion of the first card number, and wherein the request is received by the system in response to the card being added as a payment method for the user with the service provider;

transmitting, by the card storage handler, the request from the card storage handler to a transaction processor corresponding to the system;

processing, by the transaction processor, the at least the portion of the first card number based on the request;

providing, from the transaction processor to the card storage handler, a result of the processing;

determining, based on the result of the processing, the card storage handler for the user based on the public key;

storing the first status identifier and a service provider identifier for the service provider with the first card number in the card storage handler, wherein the first status identifier and the service provider identifier indicate that the first card number is being stored with the service provider; and updating an application of a device of the user with the first status identifier.

2. The system of claim 1, wherein prior to receiving the request to add the card to the card storage handler, the operations further comprise:

receiving a request to establish the card storage handler, wherein the request to establish the card storage handler is received in response to the device associated with the card storage handler downloading and executing the application associated with the system; and receiving the public key for the card storage handler.

3. The system of claim 2, wherein the public key is associated with a private key stored by the device, wherein the public key is used for encryption of data records for the card storage handler, and wherein the private key is used for decryption of the data records encrypted by the public key.

4. The system of claim 3, wherein the operations further comprise:

receiving a record request for a record of the first status identifier and the service provider identifier stored with the first card number in the card storage handler;

encrypting the record using the public key; and transmitting the encrypted record to the device.

5. The system of claim 2, wherein the operations further comprise:

generating an account for the card storage handler using the public key;

receiving payment information for the account, wherein the payment information comprises at least the first card number; and associating the payment information with the public key.

6. The system of claim 1, wherein each of the plurality of card storage handlers are associated with one of a plurality of public keys for each of the plurality of users.

7. The system of claim 1, wherein the operations further comprise:

receiving a removal update of the first card number by the service provider; and updating the first status identifier for the service provider identifier and the first card number in the card storage handler based on the removal update.

8. The system of claim 1, wherein the operations further comprise:

receiving a removal request of the first card number with the service provider through the card storage handler; and transmitting the removal request to the service provider, wherein the removal request causes the first card number to be removed as the payment method with the service provider.

9. The system of claim 1, wherein the card storage handler comprises a plurality of card numbers including the first card number and a second card number, wherein the transaction processor comprises a transaction processing application of the service provider that is executed by the system, and wherein the operations further comprise:

receiving a second status identifier associated with the second card number, wherein the second status identifier comprises one of a storage indicator of the card number or a deletion indicator of the card number; and updating the card storage handler based on the second status identifier.

10. The system of claim 1, wherein the operations further comprise:

determining a risk score for the service provider based on digital certificates from a certificate authority, a fraud reputation for the service provider, and a transaction fraud history by the service provider with the system; and authorizing the service provider for a participation with the system for the card storage handler, wherein the first status identifier and the service provider identifier are stored for the service provider in the system in response to the authorizing the service provider.

11. The system of claim 10, wherein the operations further comprise:

receiving a navigation by the device associated with the public key to an interface associated with the service provider;

determining the risk score based on the navigation navigating by the device; and displaying a trusted service provider icon in the interface on the device based on the risk score.

12. A method comprising:

receiving, by a system from a service provider, a request to add a card to a card storage handler for a user, wherein the system stores the card storage handler comprising a first card number and a public key associated with the card storage handler, wherein the system further stores a plurality of card storage handlers associated with a plurality of users, wherein the request includes the public key, a first status identifier, and at least a portion of the first card number, and wherein the request is received by the system in response to the card being added as a payment method for the user with the service provider;

transmitting, by the card storage handler, the request from the card storage handler to a transaction processor corresponding to the system;

processing, by the transaction processor, the at least the portion of the first card number based on the request providing, from the transaction processor to the card storage handler, a result of the processing;

determining, based on the result of the processing, the card storage handler for the user based on the public key;

storing the first status identifier and a service provider identifier for the service provider with the first card number in the card storage handler, wherein the first status identifier and the service provider identifier indicate that the first card number is being stored with the service provider; and updating an application of a device of the user with the first status identifier.

13. The method of claim 12, wherein prior to receiving the request to add the card to the card storage handler, the method further comprises:
- receiving a request to establish the card storage handler, wherein the request to establish the card storage handler is received in response to the device associated with the card storage handler downloading and executing the application associated with the system; and
- receiving the public key for the card storage handler.

14. The method of claim 12, wherein the public key is associated with a private key stored by the device, wherein the public key is used for encryption of data records for the card storage handler, and wherein the private key is used for decryption of the data records encrypted by the public key.

15. The method of claim 12, further comprising:
- receiving a record request for a record of the first status identifier and the service provider identifier stored with the first card number in the card storage handler;
- encrypting the record using the public key; and
- transmitting the encrypted record to the device.

16. The method of claim 13, further comprising:
- generating an account for the card storage handler using the public key;
- receiving payment information for the account, wherein the payment information comprises at least the first card number; and
- associating the payment information with the public key.

17. The method of claim 12, wherein each of the plurality of card storage handlers are associated with one of a plurality of public keys for each of the plurality of users.

18. The method of claim 12, further comprising:
- receiving a removal request of the first card number with the service provider through the card storage handler; and
- transmitting the removal request to the service provider, wherein the removal request causes the first card number to be removed as the payment method with the service provider.

19. A non-transitory machine-readable medium having stored thereon machine-readable instructions executable to cause a machine to perform operations comprising:
- receiving, by a system from a service provider, a request to add a card to a card storage handler for a user, wherein the system stores the card storage handler comprising a first card number and a public key associated with the card storage handler, wherein the system further stores a plurality of card storage handlers associated with a plurality of users, wherein the request includes the public key, a first status identifier, and at least a portion of the first card number, and wherein the request is received by the system in response to the card being added as a payment method for the user with the service provider;
- transmitting, by the card storage handler, the request from the card storage handler to a transaction processor corresponding to the system;
- processing, by the transaction processor, the at least the portion of the first card number based on the request
- providing, from the transaction processor to the card storage handler, a result of the processing;
- determining, based on the result of the processing, the card storage handler for the user based on the public key;
- storing the first status identifier and a service provider identifier for the service provider with the first card number in the card storage handler, wherein the first status identifier and the service provider identifier indicate that the first card number is being stored with the service provider; and
- updating an application of a device of the user with the first status identifier.

* * * * *